US008970525B1

(12) United States Patent
de los Reyes (10) Patent No.: US 8,970,525 B1
(45) Date of Patent: Mar. 3, 2015

(54) METHOD AND SYSTEM FOR TRACKPAD INPUT ERROR MITIGATION

(75) Inventor: Andrew de los Reyes, Belmont, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/534,827

(22) Filed: Jun. 27, 2012

(51) Int. Cl.
*G09G 5/00* (2006.01)

(52) U.S. Cl.
USPC .......................................................... 345/173

(58) Field of Classification Search
CPC ................................................... G06F 3/04883
See application file for complete search history.

(56) References Cited

U.S. PATENT DOCUMENTS

| | | | | |
|---|---|---|---|---|
| 5,889,511 | A * | 3/1999 | Ong et al. ..................... | 345/173 |
| 7,339,580 | B2 | 3/2008 | Westerman et al. | |
| 8,445,793 | B2 * | 5/2013 | Westerman et al. ....... | 178/18.03 |
| 2003/0210235 | A1 * | 11/2003 | Roberts ......................... | 345/173 |
| 2006/0038796 | A1 * | 2/2006 | Hinckley et al. ............. | 345/173 |
| 2006/0050062 | A1 * | 3/2006 | Ozawa et al. ................. | 345/173 |
| 2007/0081726 | A1 | 4/2007 | Westerman et al. | |
| 2008/0012835 | A1 * | 1/2008 | Rimon et al. ................. | 345/173 |
| 2008/0036743 | A1 * | 2/2008 | Westerman et al. .......... | 345/173 |
| 2009/0174675 | A1 | 7/2009 | Gillespie et al. | |
| 2012/0007821 | A1 | 1/2012 | Zaliva | |
| 2012/0019468 | A1 * | 1/2012 | Westerman et al. .......... | 345/173 |
| 2012/0023459 | A1 * | 1/2012 | Westerman ................... | 715/863 |
| 2012/0050210 | A1 * | 3/2012 | King et al. .................... | 345/174 |
| 2012/0158629 | A1 * | 6/2012 | Hinckley et al. ................ | 706/15 |
| 2012/0182296 | A1 * | 7/2012 | Han .............................. | 345/419 |
| 2012/0293440 | A1 * | 11/2012 | Hotelling et al. ............. | 345/173 |
| 2013/0149964 | A1 * | 6/2013 | Kreiner ........................ | 455/41.2 |

OTHER PUBLICATIONS

"Ignore Finger Resting at Bottom of Unibody Macbook Pro Touchpad?", Ubuntu forums, retrieved on Jun. 27, 2012 from http://ubuntuforums.org/showthread.php?t=1440747, 3 pages.
"Ignore Finger Resting at the Bottom of Trackpad [unibody macbook pro]", Ubuntu, retrieved on Jun. 27, 2012 from askubuntu.com/questions/105097/ignore-finger-resting-at-the-bottom-of-trackpad-unibody-macbook-pro, 2 pages.

* cited by examiner

*Primary Examiner* — Claire X Pappas
*Assistant Examiner* — Richard Hong
(74) *Attorney, Agent, or Firm* — Brake Hughes Bellermann LLP (57) ABSTRACT

In response to detecting a predetermined pressure change between two consecutive contacts on a trackpad of a computing device, the two consecutive contacts are ignored. In response to detecting a predetermined pressure change of a single contact on the trackpad, the single contact is ignored. After detecting a new contact on the trackpad after a predetermined period of time without any contact on the trackpad, any movement tied to a predetermined amount of increasing pressure on the trackpad for the new contact is temporarily discarded, for a preset amount of time.

20 Claims, 8 Drawing Sheets

METHOD AND SYSTEM FOR TRACKPAD INPUT ERROR MITIGATION

FIELD

This application relates to an input device for use with a computing device, such as a trackpad, and more specifically, to mitigating cursor wobble and to suppressing resting finger input associated with a trackpad.

BACKGROUND

Some computing devices, such as laptop computers, include one or more input devices, such as a mouse, a keyboard, or a touchscreen. Various computing devices include a trackpad or touchpad that can be used in place of or in addition to a mouse to maneuver a curser on a computer screen, or to trigger one or more functions of a computing device. Such trackpads or touchpads can be coupled to, or integrated within, the computing device.

A touchpad (also referred to herein interchangeably as a trackpad) is a pointing device featuring a tactile sensor, which is a specialized surface that can translate the motion and position of a user's fingers to a relative position on screen. Touchpads are a feature of laptop computers or mobile devices, and are also used as a substitute for a mouse, for example where desk space is scarce. Because they vary in size, they can also be found on personal digital assistants and portable media players. Wired or wireless touchpads are also available as accessories.

Often, when a finger is first set on a trackpad, the center of the finger that sets the coordinate on the trackpad unintentionally moves slightly, causing "cursor wobble"—a slight, unintended movement of a cursor on a display of the device. This cursor wobble may also occur during click events on the trackpad, or on the edge of the trackpad (for example, where a part of the finger is on the trackpad and a part of the finger is off of the trackpad). Cursor wobble also manifests when the user wants to select a link, but cursor wobble instead causes an unintended link to be selected. Another example of cursor wobble is when a user intends to use two fingers to right click, but cursor wobble instead causes the screen to move a little bit. Other issues may arise when fingers are resting on a portion of the trackpad (such as a dampened zone) and the resting fingers are misinterpreted as gesturing or scrolling inputs.

SUMMARY

According to one general aspect, in response to detecting a predetermined pressure change between two consecutive contacts on a trackpad of a computing device, the two consecutive contacts may be ignored. In response to detecting a predetermined pressure change of a single contact on the trackpad, the single contact may be ignored. After detecting a new contact on the trackpad after a predetermined period of time without any contact on the trackpad, any movement tied to a predetermined amount of increasing pressure on the trackpad for the new contact may be temporarily discarded, for a preset amount of time.

According to another general aspect, a trackpad may be configured to mitigate cursor wobble. The trackpad may include a surface, a sensor operably coupled to the surface, a controller operably coupled to the sensor, a bus operably coupled to the controller, a kernel driver configured to communicate with the bus, and a gesture library configured to communicate with the kernel driver. The gesture library may included executable code to: in response to detecting a predetermined pressure change between two consecutive contacts on the surface, ignore the two consecutive contacts; in response to detecting a predetermined pressure change of a single contact on the surface, ignore the single contact; after detecting a new contact on the surface after a predetermined period of time without any contact on the surface, temporarily discard, for a preset amount of time, any movement tied to a predetermined amount of increasing pressure on the surface for the new contact; determine, for an existing contact on the surface, if increasing or decreasing pressure is currently blocked for the existing contact, based on a record associated with the existing contact; if increasing or decreasing pressure is currently blocked for the existing contact, determine a total distance the existing contact has traveled from a coordinate in the record associated with the existing contact; if the total distance equals or exceeds a predetermined value, allow the movement of the cursor based on the movement of the existing contact on the surface; update the record associated with the existing contact to indicate no blocking of increasing pressure for the existing contact; and update the record associated with the existing contact to indicate no blocking of decreasing pressure for the existing contact.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

An input device for use with a computing device can be used to communicate with and control operations of a computing device. The input device can be configured to be contacted by a user on a top surface of the input device to trigger an electronic signal within the computing device. For example, a user can slide or move one or more fingers, or, in some cases, knuckles or a portion of a hand, across the top surface of the input device to move a curser visible on a display of the computing device. The input device can also include a "click" function to allow the user to for example, click or select items on the display, or to actuate a right click function. Various input devices described herein can allow a user to actuate a click function by exerting or applying a force on a top surface of the input device at any location on the top surface. In some implementations, the input device may not have a specific sensor location that the user finds to actuate a click function. In other implementations, the input device may include a portion (e.g., a bottom third of a trackpad) that the user may depress (e.g., with a certain amount of pressure) to actuate a click function. The input device can also travel a consistent vertical distance and provide a consistent tactile response to the user when the user clicks on any portion of the top surface of the input device.

As used herein, a reference to a top view in a figure refers to a view as viewed by a user during use of an input device. For example, a top view can refer to a view of the input device as disposed within a computing device such that the user can contact the top surface of the input device to initiate an action within the computing device.

Figure 1A:
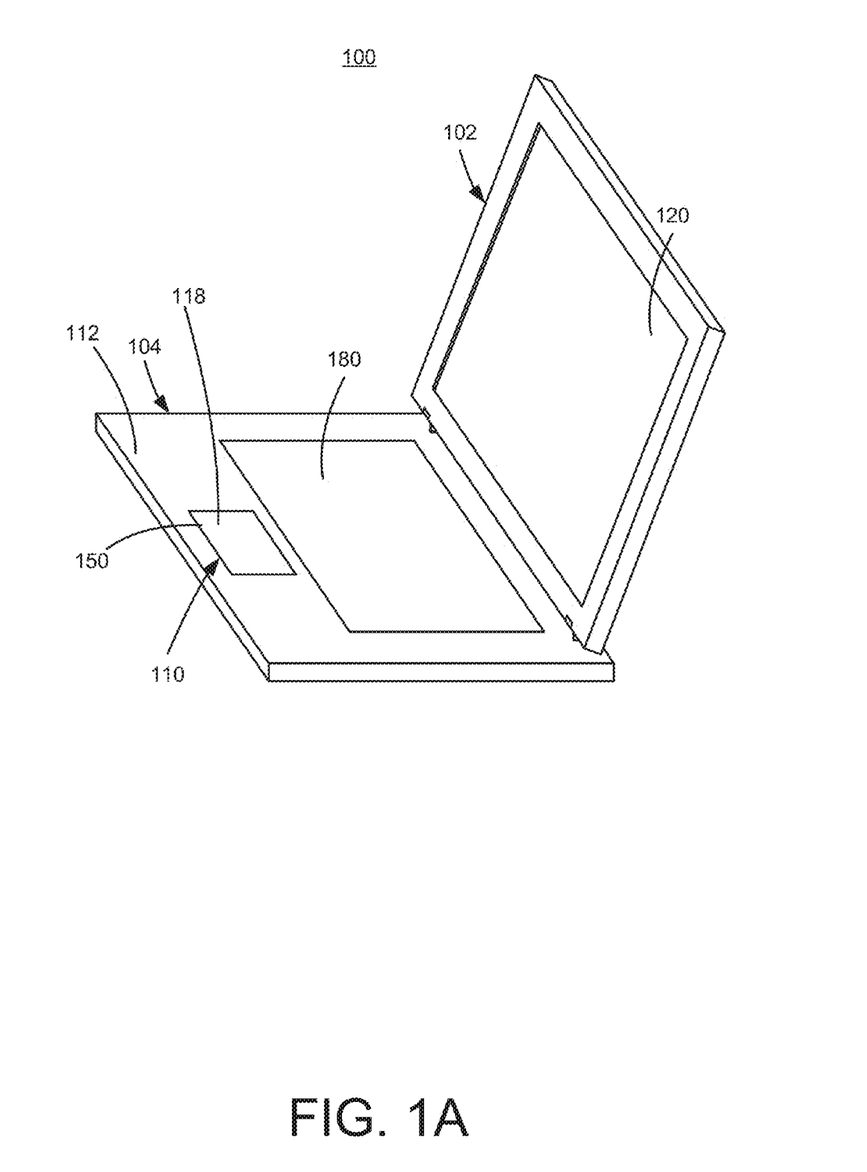
FIG. 1A is a block diagram of a computing device including an input device, according to an implementation described here.

FIG. 1A is a block diagram of a computing device including an input device, according to an implementation described here. Computing device 100 includes a display portion 102 and a base portion 104. Display portion 102 may include a display 120 that can be, for example, a liquid crystal display (LCD), a light emitting diode (LED) display, or other type of electronic visual display device. The base portion 104 can include, among other components, a trackpad 110, a housing 112, and a keyboard portion 180.

The trackpad 110 can include a cover member 118, a sensor (not shown), and a top surface 118, configured to receive inputs (e.g., a touch, swipe, scroll, drag, click, hold, tap, combination of inputs, etc.) by a user. The sensor can be activated when a user enters an input on the top surface 118 of the trackpad 110, and can communicate electronic signals within the computing device 100. The sensor can be, for example, a flame-retardant class-4 (FR3) printed circuit board. Other components, such as a dome switch, adhesive sheets, and cables (not shown) may also be integrated in computing device 100 to process input by a user via trackpad 110 or keyboard 180. Various elements shown in the display 120 of the computing device 100 may be updated based on various movements of contacts on the trackpad 110 or keyboard 180.

Trackpads, such as trackpad 110, may be used in self-contained portable laptop computers such as device 100, and do not require a flat surface near the computer. The trackpad may be position close to the keyboard 180. The trackpad 110 may only use very short finger movements to move a cursor across the display 120. While advantageous, this also makes it possible for a user's thumb to move the mouse cursor accidentally while typing, or for cursor wobble to unintentionally move the cursor, for example when a finger first touches the trackpad 110. Trackpad functionality is also available for desktop computers in keyboards with built-in touchpads, and in mobile devices, as described in more detail below with respect to FIG. 7.

The components of the input devices (e.g., 110, 180) described here can be formed with a variety of different materials such as plastic, metal, glass, ceramic, etc. used for such components. For example, the cover member 118 and base member 104 can each be formed, at least in part, with an insulating material and/or conductive material such as a stainless steel material, for example, SUS301 or SUS304.

Some touchpads and associated device driver software may interpret tapping the trackpad surface 118 as a click, and a tap followed by a continuous pointing motion (a "click-and-a-half") can indicate dragging. Tactile trackpads may allow for clicking and dragging by incorporating button functionality into the surface of the trackpad itself (e.g., surface 118). To select, a user may press down on the surface 118 instead of a physical button. To drag, instead performing a "click-and-a-half" technique, a user may press down while a cursor is positioned on the object in display area 120, drag without releasing pressure, and let go when done. Trackpad drivers (not shown) can also allow the use of multiple fingers to facilitate other mouse buttons (such as two-finger tapping for a center button).

Some trackpads have "hotspots," which are locations on the trackpad used for functionality beyond a mouse. For example, on certain trackpads, moving the finger along an edge of the trackpad may act as a scroll wheel, controlling the scrollbar and scrolling the window in a display that has the focus (e.g., scrolling vertically or horizontally). Certain trackpads may use two-finger dragging for scrolling. Additionally, some trackpad drivers support tap zones, regions where a tap will execute a function, for example, pausing a media player or launching an application. All of these functions may be implemented in trackpad device driver software, and these functions can be modified or disabled.

Computing devices, such as device 100, may feature multitouch trackpads such as input device 110, which can sense any number of fingers (such as up to five, or more) simultaneously, providing more options for input, such as the ability to bring up a menu by tapping two fingers, dragging two fingers for scrolling, or gestures for zoom in or out or rotate. Additionally, although input device 110 is depicted as a rectangle, it will be appreciated that input device 110 could be formed in a different shape, such as a circle, without departing from the scope of the techniques described here.

Figure 1B:
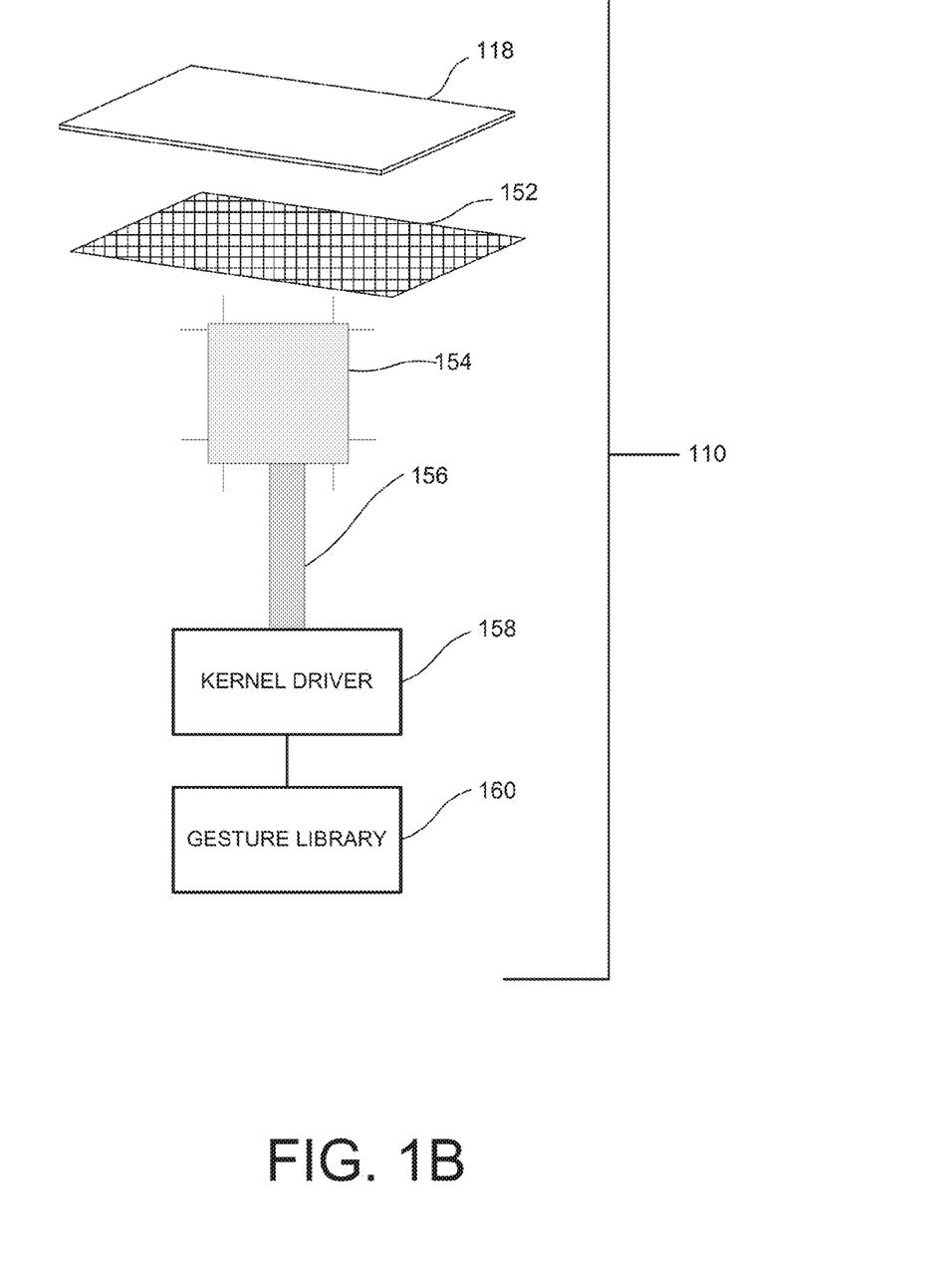
FIG. 1B is a block diagram of a trackpad and related components, according to an implementation described here.

FIG. 1B is a block diagram of a trackpad and related components, according to an implementation described here. Trackpad 110 includes surface 118, sensor 152, controller 154, bus 156, kernel driver 158, and gesture library 160.

Surface 118 may be configured to be contacted by a user to actuate and trigger an electrical response within the computing device 100. Surface 118 may be operably coupled to sensor 152. Sensor 152 can be activated when a user enters an input (e.g., a touch, swipe, or a click) on the top surface 118 of the trackpad 110. The sensor 152 can be, for example, a flame-retardant class-4 (FR4) printed circuit board. Controller 154 may be operably coupled to sensor 152. Controller 154 may be an embedded microcontroller chip and may include, for example, read-only firmware. Controller 154 may include a single integrated circuit containing a processor core, memory, and programmable input/output peripherals. Bus 156 may be a PS/2, I2C, SPI, WSB, or other bus. Bus 156 may be operably coupled to controller 154 and may communicate with kernel driver 158. Kernel driver 158 may include firmware and may also include and/or communicate with gesture library 160. Gesture library 160 may include executable code, data types, functions, and other files (such as JAVASCRIPT files) which may be used to process input to trackpad 110 (such as multitouch gestures). Gesture library 160, in combination with kernel driver 158, bus 156, controller 154, sensor 152, and surface 118, may be used to implement various processes, such as those described in more detail below with respect to FIGS. 5 and 6, for example.

Figure 2:
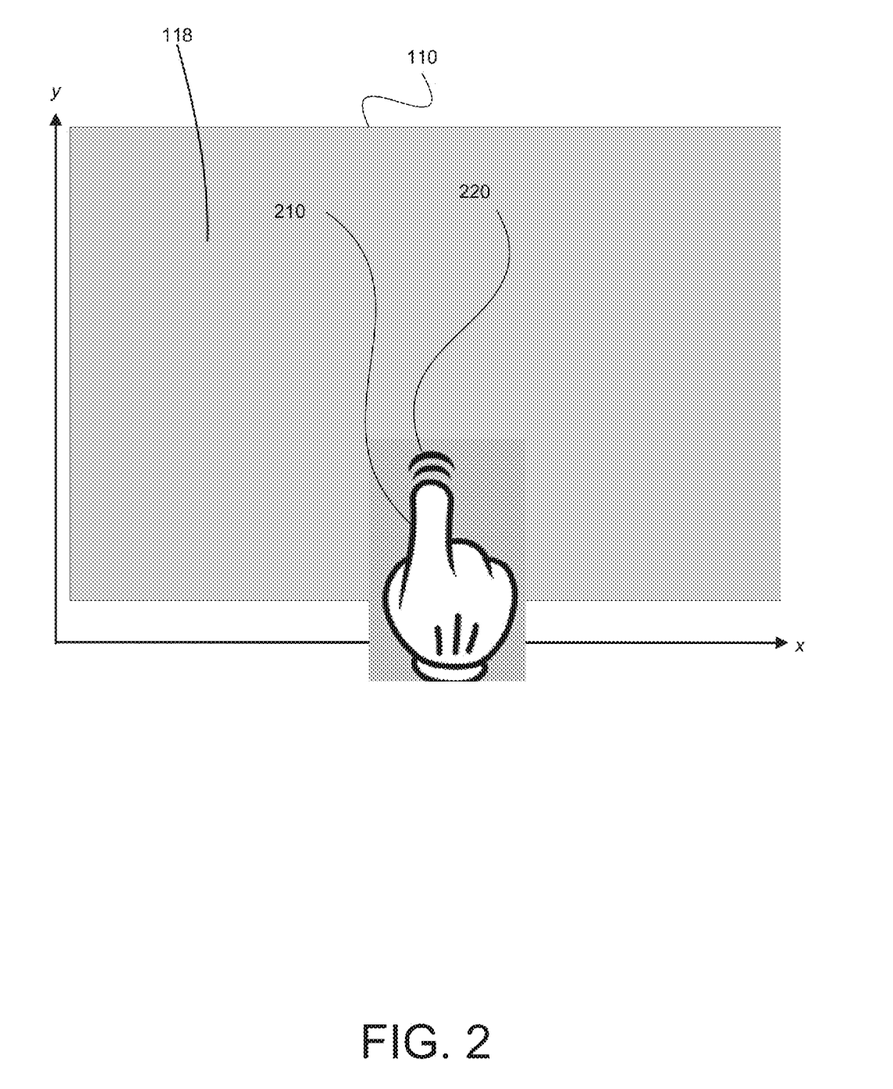
FIG. 2 is a block diagram of a top view of an input device, according to an implementation described here.

FIG. 2 is a block diagram of a top view of an input device, according to an implementation described here. Input device 110 may be a trackpad including surface 118. A contact, such as finger 210, may exert pressure on surface 118. In some cases, for example when the finger 210 is first set on trackpad 110, the center of the finger 210 that sets the (x, y) coordinate on the trackpad 110 unintentionally moves slightly, represented by lines 220. This unintentional movement may cause cursor wobble within a display area 120 of the display 120 of the computing device 100 shown in FIG. 1A. Alternatively or additionally, when the first portion of a finger 210 first touches trackpad 110, the trackpad may recognize this as a movement or click, even though the entire fingerpad has not yet touched the trackpad and the user did not intend to move the cursor or to click yet.

Figure 3:
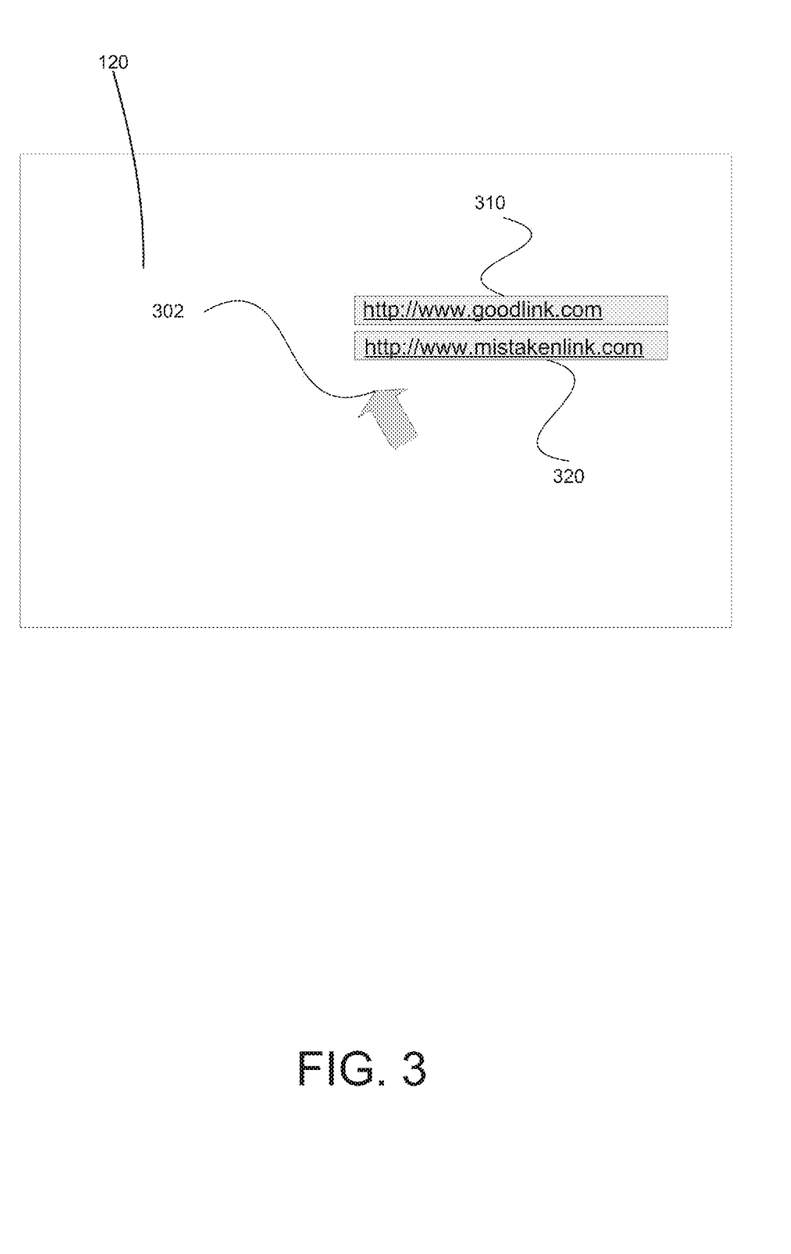
FIG. 3 is a block diagram of a display, according to an implementation described here.

FIG. 3 is a block diagram of a display, according to an implementation described here. FIG. 3 illustrates another example of a finger causing unintentional cursor wobble when contacting a trackpad. In the example shown in FIG. 3, display area 120 represents a display of computing device 100 shown in FIG. 1A. Display area 120 includes a graphical cursor icon 302, and two links representing URLS, "http://www.goodlink.com" link 310, and "http://www.mistakenlink.com" link 320. A user may intend to select link 310 with cursor 302, but due to cursor wobble (e.g., wobble 220 shown in FIG. 2), the user may unintentionally cause cursor 302 to select link 320 instead. This may prove frustrating for a user, and it may prove difficult for a user to personally adjust cursor settings to correct for cursor wobble. The methods and systems described here provide for automatic correction of cursor wobble without requiring additional preferences created by a user.

Figure 4:
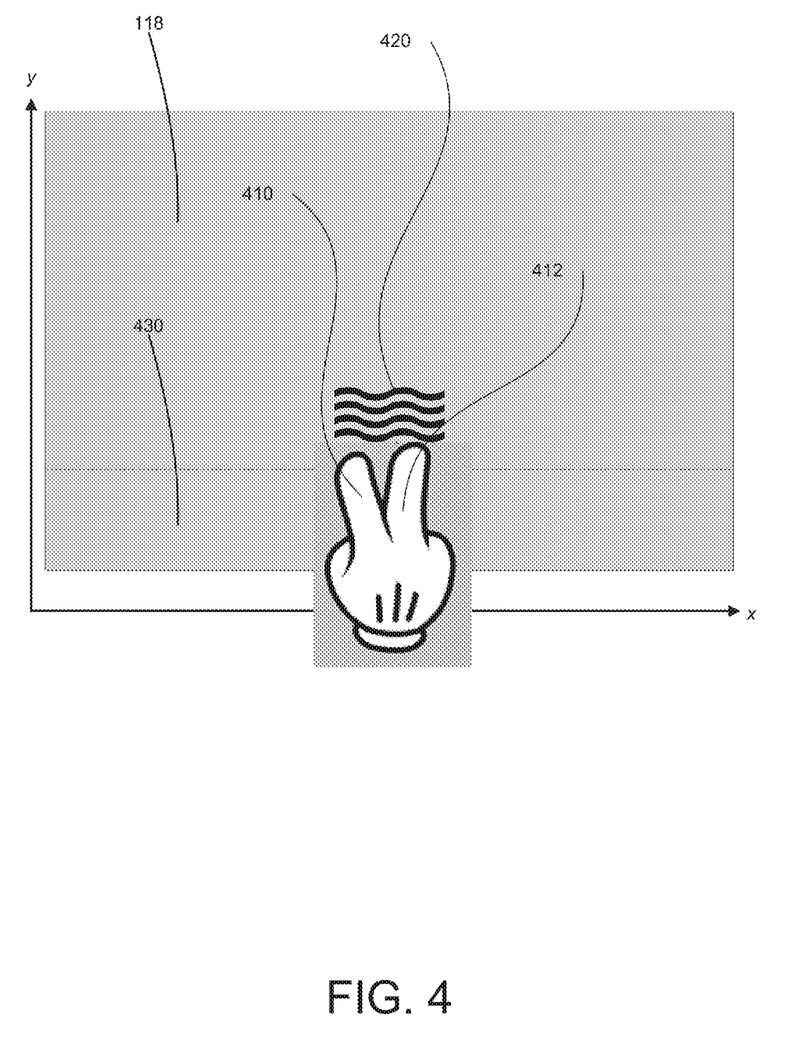
FIG. 4 is a block diagram of a top view of an input device, according to an implementation described here.

FIG. 4 is a block diagram of a top view of an input device, according to an implementation described here. FIG. 4 illustrates another example of unintentional cursor wobble when a user is contacting surface 118 of an input device such as a trackpad.

In some implementations, surface 118 may include zone 430 (represented by the area below the dashed line), which may represent a "dampened" zone area of the input device. Zone 430 may be any dimension, such as 1 centimeter from the bottom (or top, or side) of a trackpad.

In one example shown in FIG. 4, a user may have intended to use two fingers 410 and 412 to "right click" via trackpad surface 118. Instead, the user may cause unintentional movement, which may in turn cause the display area of a screen to move a little bit. This unintentional movement by fingers 410 and 412 is represented by lines 420. This movement may be unintentional because the user really intended to cause a cursor to right click. Instead, the trackpad misinterpreted the user's two-finger input on surface 118, and caused the display area of a computing device to move slightly.

In various other situations, two-finger scrolling may be incorrectly detected, for example in zone 430 of the input device. For example, a user may place one finger on surface 118 inadvertently, for example as merely a "resting" finger, and not a scrolling or gesturing finger. Some users may rest fingers on the bottom of a trackpad, such as in zone 430, out of habit (such habit created, for example, from using trackpads that include physical buttons at or near the bottom of a trackpad) or out of comfort.

In such cases, various rules may be applied (e.g., by gesture library 160 shown in FIG. 1B) to mitigate errors in the detection of two-finger scrolling, or other input actions, for example in the zone 430. For example, in some implementations, palm detection may occur first on an input device 110. A border around the edge of the input device (e.g., 2 centimeters in height and width) may be utilized so that the system does not consider new contacts that start in the border as fingers until the contacts travel toward the center some predetermined distance, at which point a system may determine whether the contact is, for example, a palm or a thumb. After palm detection happens for a given frame of input, a set of contacts may exist on the input device that are known to be non-palms. Thumb detection may also be implemented. For example, if the input device detects that a contact has a certain pressure (i.e., surface area touching the pad, which may also be known as "capacitance"), which pressure is greater than another contact, it may be considered a thumb, and may be marked as a thumb (e.g., in a record associated with the contact). After thumb detection occurs, there may still be some number of contacts on the input device. The input device may consider these contacts as fingers that can cause a gesture.

The input device may be able to detect if two fingers are likely be scrolling or not. In some implementations, the input device may detect two fingers on a certain portion of surface 118. For example, the input device 110 may detect fingers 410 and 412 in FIG. 4, or two fingers that are detected as the closest to the keyboard 180 on the device 100 shown in FIG. 1A. If the input device detects a potential scroll gesture by the fingers, the system may check if any of the two fingers are in the zone 430. If neither finger 410 or 412 is in the zone 430, the system may proceed to detect scrolling by the two fingers, for example using existing logic for detecting such two-finger scrolling. If one finger (e.g., finger 410) is in the zone 430, however, the system may detect if the one finger 410 is moving in the same direction at least half as much as the non-zoned finger 412 (i.e., the finger on surface 118 but not in zone 430) to trigger scrolling. Otherwise, the system may consider the one finger 410 to be a resting finger.

If both fingers 410 and 412 are in the zone 430, the system may determine which finger is moving more and which is moving less. If the finger that is moving less is the finger in the zone 430, then the system may apply existing logic for only having one finger in the zone 430. By applying such logic, one result is that both fingers generally would need to be moving around the same speed to trigger scrolling if they were both in the zone 430. Thus, the system may avoid erroneously designating a "resting" finger as a "scrolling" finger, or as other input, when the user did not intend for that finger to make any movement at all.

Figure 5:
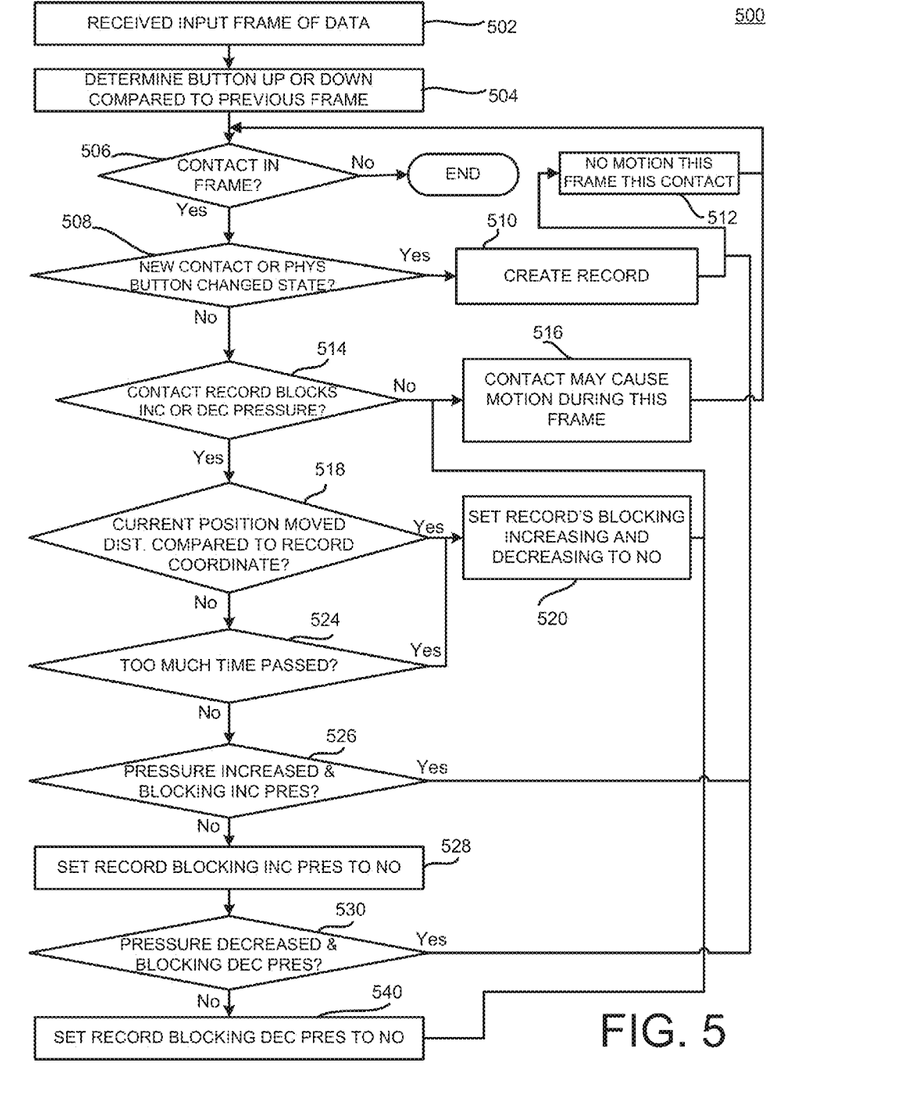
FIG. 5 is a flow diagram of an exemplary process that may be used to mitigate cursor wobble.

FIG. 5A is a flow diagram of an exemplary process that may be used to mitigate cursor wobble. Process 500 may be executed, for example, by a microcontroller of a computing device (such as controller 154 shown in FIG. 1B) and/or may be implemented as part of gesture library 160 shown in FIG. 1B. Process 500 is an example only, and may have steps added, deleted, reordered, or modified. Process 500 may be applied for each contact (e.g., finger) in every received input frame of data (502) (of which there may be, for example, 80 per second). Motion on a display may be the result of a finger moving between two consecutive frames of input.

For each "contact" (defined here as any acceptable contact on the trackpad that the trackpad recognizes as a valid input, such as a finger, thumb, etc.) that is currently on the trackpad, the computing device may maintain some information in a record to avoid accidental wobble. Records may be maintained per-finger. If there are three fingers on the trackpad at a given time, for example, at that time there would be three records.

A record may include any or all of the following: (1) an (x, y) coordinate where the device started blocking wobble (such as the initial coordinate when the contact first appeared); (2) a time that the device started blocking cursor wobble (where blocking cursor wobble may include maintaining a position of a cursor or ignoring a movement of a certain contact on the trackpad), which may be the time when the contact first appeared; (3) a Boolean value to represent if the device is currently suppressing increasing pressure (e.g., yes or no, which may be represented as a numerical value such as 0 or 1); and (4) a Boolean value to represent if the device is currently suppressing decreasing pressure (e.g., yes or no).

As an illustrative example, the record may indicate the values as shown in Table 1 below:

TABLE 1

| Coordinate (x, y) | Time | Increasing Pressure | Decreasing Pressure |
|---|---|---|---|
| 10, 20 | 3:07:01.126 AM | NO | YES |

Each frame of input data may be captured in milliseconds or other measures, for example nanoseconds, or any measure of duration. Process 500 includes determining if a button or a portion of the trackpad went up or down compared to the previous frame (504). In some implementations, for example, the trackpad itself may operate as a giant button that a user can click, such that the whole trackpad or a portion of the trackpad is clickable. In various implementations, when a button (e.g., the trackpad) goes down or up, pressure may be increasing or decreasing. For example, when a button goes up, the device may interpret the action as a user lifting a finger, so pressure may be decreasing for a time after the button goes up.

For each contact in the frame (506, yes), the process continues to the next finger. If no more contacts are in the frame (506, no), the process may end.

The process determines if the finger is a new contact on the trackpad, or if the physical button changed state (508). If the contact is a new finger (508, yes), or in some implementations, if the physical click button changed state (e.g., went up or down) compared to the last input frame, process 500 may create a new record (510) associated with the contact, or replace the existing record (if any) for the finger. In some implementations, the record is set to have the following data: (1) an (x, y) coordinate representing the current position of the contact on the trackpad; (2) a time the device started blocking wobble, which is set to the current time; (3) blocking increasing pressure is set to 'YES' for new contacts or for a button going up, otherwise, the value is set to 'NO'; (4) the value for blocking decreasing pressure is set to 'YES.'

In some implementations, if process 500 creates or updates a record (510), the device does not allow that finger to cause motion on a display for this frame (e.g., for a preset amount of time such as 750 milliseconds, or until the finger moves a certain distance from a coordinate in the record), and then proceeds determine if any other fingers are in the frame (506).

Otherwise, if a new contact is not detected (508, no) for existing fingers, process 500 determines if the record for that contact currently set to "blocking" increasing or decreasing pressure for the contact (514). The terms "blocking" increasing pressure or decreasing pressure, as used herein, may include setting a value (e.g., to true/false or yes/no) for a record associated with the contact, and thus maintaining a cursor position on a display of the device or otherwise ignoring pressure of the contact on the trackpad for a contact finger associated with the record. For example, the device may ignore pressure from a contact (e.g., finger) on a trackpad for a predetermined amount of time, such as a few milliseconds.

If both blocking increase and decreasing pressure are set to 'NO,' (514, no) for the contact, this contact may be allowed to cause motion during this frame (516) (e.g., of a cursor icon, scroll bar, etc.), and the process may continue to determine if there is another contact to process in the frame (506). Otherwise, if at least one of blocking increasing or decreasing pressure is set to 'YES', the process proceeds (514, yes).

The process may examine a total distance this contact has traveled from the coordinate in the record of the contact. For example, if a user moves a finger a predetermined distance across a trackpad, this may indicate that the user intended to scroll across a display area of a screen. The process may determine if the current position of the contact has moved a certain distance from a coordinate in the record associated with the contact (518). If the distance is equal to or greater than some value (such as 4 mm) (518, yes), the device may set blocking increasing and decreasing to 'NO' in the record associated with the contact (520). This distance may indicate that the movement should not be suppressed, so the device may let this contact cause motion during this frame (516), and move on to determine if there is another contact in the frame to process (506).

If the distance is not equal to or greater than a preset value (518, no), however, this may indicate that the finger movement was unintentional, and the process continues, to check the current time against the time in the record for the contact (524). If the current time is equal to or greater than some preset value after the time in the record, such as 75 milliseconds, (524, yes) this may indicate that enough time has passed, for example to indicate that this contact may be slowly being rocked back or forth, and that this contact should cause motion during this frame (e.g., of a cursor or scrollbar on the display area). The process may set blocking increasing and decreasing to 'NO' in the record (520), allow this contact to cause motion during this frame (516), and move on to determine if there is another contact to process (506).

The process 500 may compare the current pressure of the contact with the pressure from of the same contact from the previous input frame. The process may determine if pressure has increased since the previous input frame. If the pressure has increased and if the device is supposed to be blocking increased pressure for this contact (for example, based on the record associated with the contact) (526, yes), the process does not allow this contact to cause motion in this frame (512), and may move to the next contact in the frame (if any) (506). If increased pressure is not being blocked for this contact or if pressure has not increased (526, no), the record indicated whether the device is currently blocking increasing pressure for the contact is set to 'NO' (528).

The process determines if decreased pressure is being blocked for this contact, for example based on the record for the contact. If the device is blocking decreasing pressure and pressure has gone down (530, yes), the device does not allow the finger to cause motion (512) on the display area, and the device may continue on to analyze the next finger (if any) (506).

If the device is not blocking decreasing pressure and/or pressure has not gone down (530, no), the device may set the record to 'NO' to indicate whether the device is currently blocking decreasing pressure for the contact (540), and the contact may cause motion during this frame (516). The system may continue to analyze contacts for each frame of input data and for each contact that is on the trackpad, if any (506).

The process 500 may have steps added, deleted, or modified. For example, step 514 may be deleted. Other implementations are also contemplated. For example, as discussed above, some computing devices include physical buttons associated with trackpads or touchpads, which buttons allow for user clicks or other input actions. The physical buttons may be adjacent to the trackpads, or incorporated as part of the trackpads or touchpads. In some cases, the physical buttons may be visibly separated from the trackpad. In some implementations, the buttons may be virtually invisible and may be incorporated part of the trackpad, for example under surface area 118 and on the bottom of the trackpad.

Figure 6:
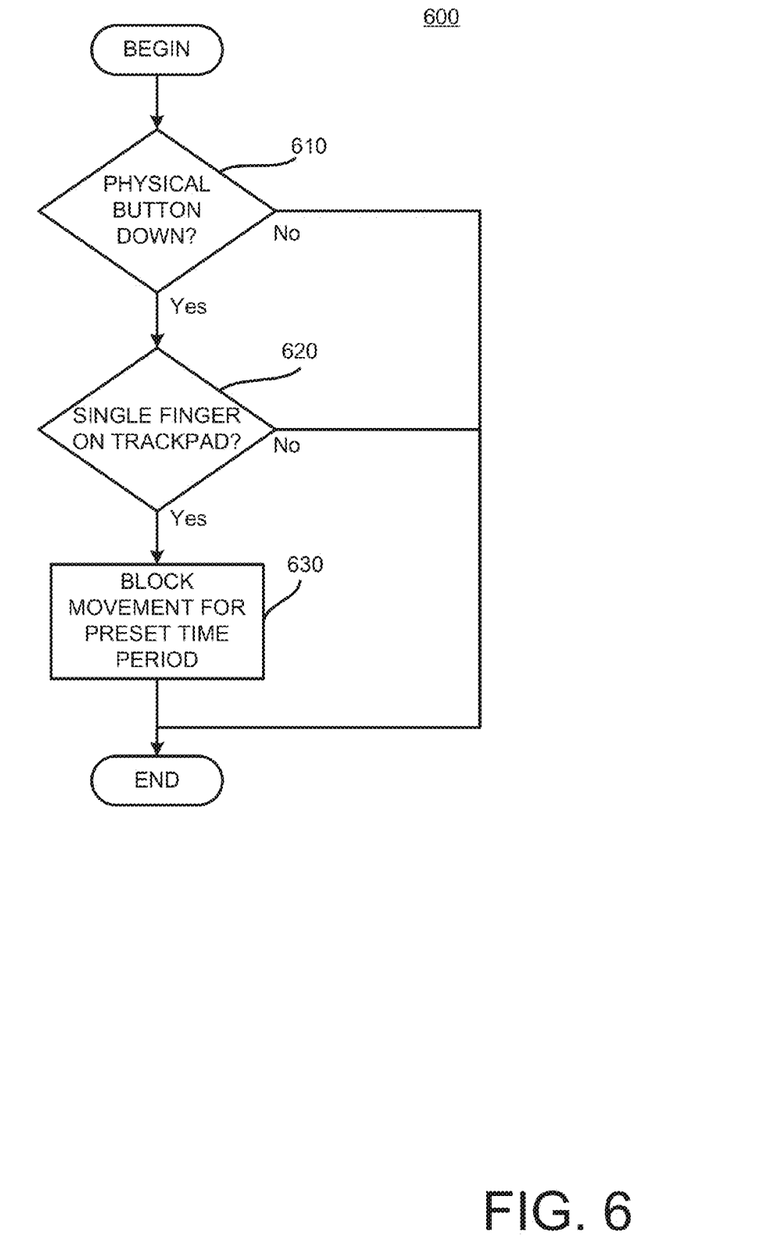
FIG. 6 is a flow diagram of an exemplary process that may be used to mitigate cursor wobble.

FIG. 6 is a flow diagram of an exemplary process that may be used to mitigate cursor wobble, for example when at least one physical button is associated with an input device such as a trackpad or touchpad. Process 500 may be executed, for example, by a microcontroller of a computing device (such as controller 154 shown in FIG. 1B) and/or may be implemented as part of gesture library 160 shown in FIG. 1B. Process 600 may include determining if the physical click button goes down (610). If so (610, yes), the process analyzes whether or not there is only a single finger on the touchpad (620) at that time. If there is only a singer finger on the touchpad when the physical click button goes down (620, yes), the system may conclude that the finger must have been exerting some strength to do the click, and thus may wiggle a fair amount. Accordingly, the system may block movement for a present time period (630), such as 200 milliseconds, even if the single finger moves during that time period. As another example, in contrast, if a user has more than a single finger on the trackpad (620, no) (such as a finger and resting thumb on the trackpad, for example where the thumb does the heavy pushing but the finger controls cursor movement), less wobble is expected and movement may not be blocked.

In still other implementations, if certain pressure change in a finger between two consecutive events is detected, or a certain pressure change over a certain length of time is detected, then the device may ignore the contact, for example because this may indicate that the contact, or a portion of the contact, was unintentional.

Alternatively or additionally, when a finger first touches a trackpad, the device may disregard (e.g., block) movement if that movement is tied to increasing pressure, and the device may also suppress movement to eliminate finger roll, for a temporary amount of time or, for example, until the finger moves a significant distance from a coordinate where the finger contacted the trackpad when the record for the finger was created. In still other implementations, a buffer of events may be maintained to introduce a delay (e.g., few milliseconds) and detect a finger left movement, then abort motion. Using the delay, the movement may be smoothed out. Additionally, a variable delay may be used when a new finger is detected on the input device.

Although the descriptions in FIGS. 1-6 are generally focused on trackpads, the implementations described with respect to FIGS. 1-6 may also be utilized in conjunction with touchscreens or any other input devices that may be utilized in conjunction with various displays that may experience cursor wobble. Additional examples of computing devices with various input devices that may be used to suppress cursor wobble are depicted in FIG. 7.

Figure 7:
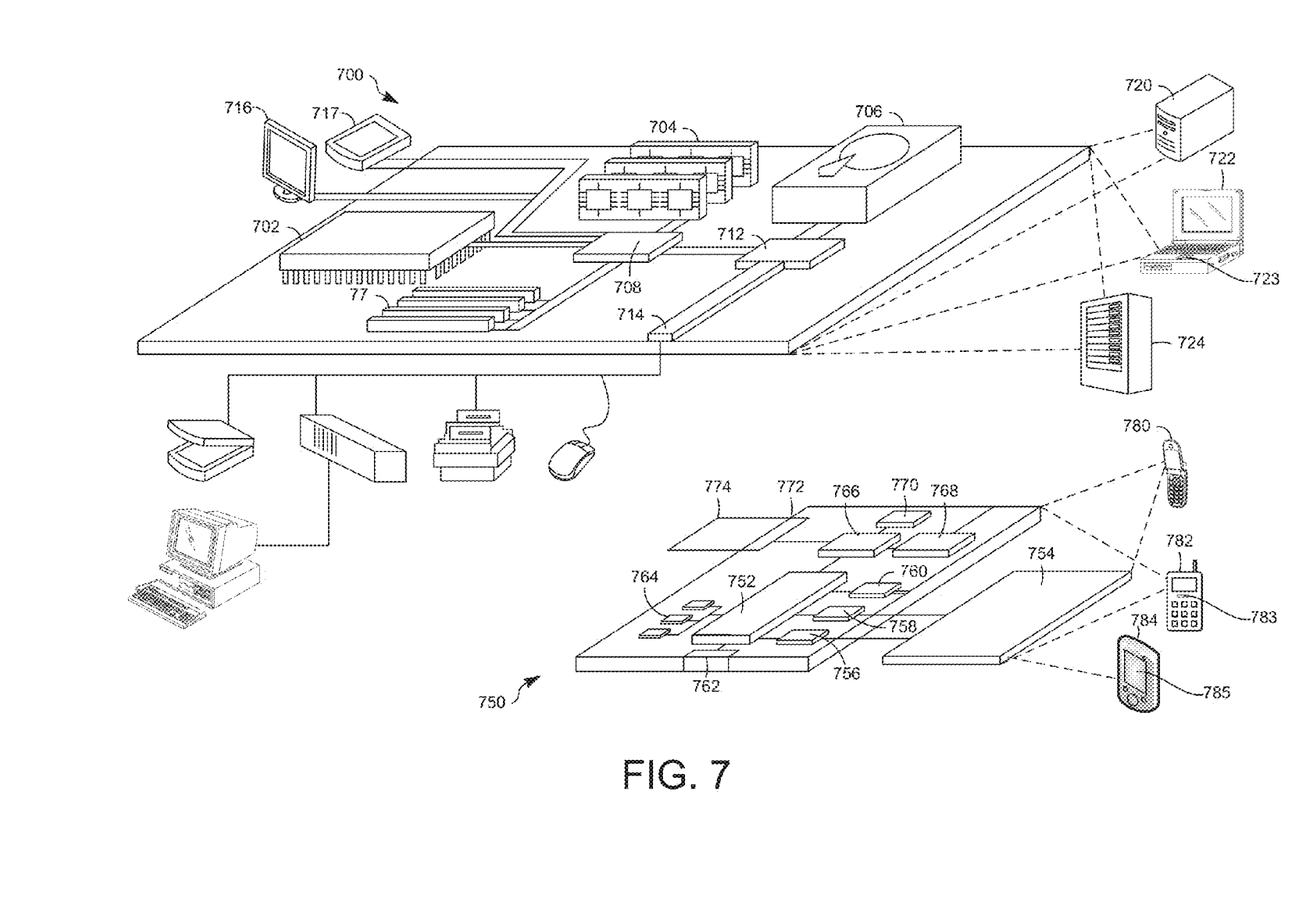
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716, which may be a touch screen display (e.g., through a graphics processor or accelerator), trackpad 717, and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, BLUETOOTH, ETHERNET, wireless ETHERNET) may be coupled to one or more input/output devices, such as a trackpad, keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722, including trackpad 723. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, as well as a trackpad, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, which may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782 including a trackpad 783, a smart phone 784 including a touch screen 785, a personal digital assistant, or other similar mobile device including a trackpad, touchpad, touch screen, or input device(s).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order. In addition, other steps may be provided, or steps may be eliminated, from the described flows, and other components may be added to, or removed from, the described systems. Accordingly, other implementations are within the scope of the following claims.

What is claimed is:

1. A method for mitigating cursor wobble, comprising:
   in response to detecting a predetermined pressure change between two consecutive contacts on a trackpad of a computing device, ignoring the two consecutive contacts;
   in response to detecting a predetermined pressure change of a single contact on the trackpad, ignoring the single contact;
   after detecting a new contact on the trackpad after a predetermined period of time without any contact on the trackpad, temporarily discarding, for a preset amount of time, any movement tied to a predetermined amount of increasing pressure on the trackpad for the new contact; and
   for an existing contact on the trackpad:
      determining that detecting increasing pressure or decreasing pressure for the existing contact is currently blocked, based on a record associated with the existing contact; and
      based on determining that detecting increasing pressure or decreasing pressure for the existing contact is currently blocked, determining, from a coordinate included in the record, that a total distance the existing contact has traveled equals or exceeds a predetermined value.

2. The method of claim 1, further comprising:
   maintaining a record for each contact currently detected on the trackpad.

3. The method of claim 2, wherein the record includes: a coordinate, a time, a boolean value showing if increasing pressure is currently suppressed, and a boolean value showing if decreasing pressure is currently suppressed.

4. The method of claim 3, further comprising: for each frame of input data, replacing the existing record associated with each contact with a new record.

5. The method of claim 4, wherein each new record includes: a coordinate for a current position of a contact on the trackpad, and a current time.

6. The method of claim 1, further comprising:
   detecting a physical click on a button associated with the trackpad.

7. The method of claim 6, further comprising:
   determining a number of contacts on the trackpad at the time of the physical click on the button.

8. The method of claim 7, further comprising:
   if only a single contact is detected on the trackpad at the time of the physical click, discarding any movement tied to the single contact on the trackpad for a predetermined period of time after the physical click.

9. The method of claim 1, further comprising:
   determining that detecting increasing pressure or decreasing pressure for the existing contact is not currently blocked; and
   based on determining that increasing pressure or decreasing pressure for the existing contact is not currently blocked, allowing a movement of a cursor on a display of the computing device based on a movement of the existing contact on the trackpad.

10. The method of claim 1, further comprising:
    based on determining that the total distance the existing contact has traveled equals or exceeds the predetermined value:
       allowing a movement of a cursor on a display of the computing device based on the total distance the existing contact has traveled on the trackpad;
       updating the record associated with the existing contact to indicate no blocking of detecting increasing pressure for the existing contact; and
       updating the record associated with the existing contact to indicate no blocking of detecting decreasing pressure for the existing contact.

11. The method of claim 1, further comprising:
    based on determining that detecting increasing pressure or decreasing pressure for the existing contact is currently blocked, determining, from a coordinate included in the record, that a total distance the existing contact has traveled is less than the predetermined value; and
    based on determining that the total distance is less than the predetermined value:
       comparing a current pressure of the existing contact with a previous pressure for the existing contact from a previous input frame associated with the record associated with the existing contact.

12. The method of claim 11, further comprising:
    if the current pressure is greater than the previous pressure and if increasing pressure is currently set as blocked for the existing contact in the record associated with the existing contact, disregarding movement of the existing contact for a predetermined period of time.

13. The method of claim 11, further comprising:
    if the current pressure is less than the previous pressure and if decreasing pressure is currently set as blocked for the existing contact in the record associated with the existing contact, disregarding movement of the existing contact for a predetermined period of time.

14. The method of claim 1, further comprising:
    determining if a record is associated with the new contact currently detected on the trackpad;
    creating a new record for the new contact currently detected on the trackpad if no record was associated with the new contact; and
    disregarding movement of the new contact for a preset amount of time.

15. The method of claim 1, further comprising:
    detecting a coordinate location of the new contact on the trackpad.

16. The method of claim 1, further comprising:
    determining if a first contact and a second contact on the trackpad are in a predetermined zone of the trackpad;
    if neither of the first contact nor the second contact are in the predetermined zone of the trackpad, detecting two-finger scrolling by the first contact and the second contact; and
    if the first contact is in the predetermined zone:
        triggering two-finger scrolling if the first contact is moving on the trackpad in the same direction at least half as much as the second contact; and
        disregarding input from the first contact if the first contact is not moving on the trackpad in the same direction at least half as much as the second contact.

17. A non-transitory computer readable medium including instructions for mitigating cursor wobble on a display of a computing device, the instructions comprising:
    detecting a contact on a trackpad;
    determining that detecting increasing pressure or decreasing pressure for the contact is currently blocked, based on a record associated with the contact;
    determining, from a coordinate included in the record, that a total distance the contact has traveled on the trackpad equals or exceeds a predetermined value; and
    based on determining that the total distance the existing contact has traveled on the trackpad equals or exceeds the predetermined value, allowing a movement of a cursor on a display of the computing device based on the total distance the contact has traveled on the trackpad.

18. A trackpad configured to mitigate cursor wobble, comprising:
    a surface;
    a sensor operably coupled to the surface;
    a controller operably coupled to the sensor;
    a bus operably coupled to the controller;
    a kernel driver configured to communicate with the bus; and
    a gesture library configured to communicate with the kernel driver, the gesture library including executable code to:
        in response to detecting a predetermined pressure change between two consecutive contacts on the surface, ignore the two consecutive contacts;
        in response to detecting a predetermined pressure change of a single contact on the surface, ignore the single contact;
        after detecting a new contact on the surface after a predetermined period of time without any contact on the surface, temporarily discard, for a preset amount of time, any movement tied to a predetermined amount of increasing pressure on the surface for the new contact;
        determine, for an existing contact on the surface, if increasing or decreasing pressure is currently blocked for the existing contact, based on a record associated with the existing contact;
        if increasing or decreasing pressure is currently blocked for the existing contact, determine a total distance the existing contact has traveled from a coordinate in the record associated with the existing contact;
        if the total distance equals or exceeds a predetermined value, allow the movement of the cursor based on the movement of the existing contact on the surface;
        update the record associated with the existing contact to indicate no blocking of increasing pressure for the existing contact; and
        update the record associated with the existing contact to indicate no blocking of decreasing pressure for the existing contact.

19. The non-transitory computer readable medium of claim 17, further comprising:
    determining, from a previous input frame associated with the record, that a current pressure of the contact is greater than a previous pressure of the contact; and
    disregarding movement of the contact for a predetermined period of time.

20. The non-transitory computer readable medium of claim 17, further comprising:
    determining, from a previous input frame associated with the record, that a current pressure of the contact is less than a previous pressure of the contact; and
    disregarding movement of the contact for a predetermined period of time.

* * * * *